United States Patent [19]
Borzea et al.

[11] Patent Number: 6,091,383
[45] Date of Patent: *Jul. 18, 2000

[54] DIMMABLE ELD WITH MIRROR SURFACE

[75] Inventors: Marian Borzea, Farmington Hills; Silviu Palalau, Birmingham; Daniel Toffolo, Dearborn, all of Mich.

[73] Assignee: Lear Automotive Dearborn, Inc., Southfield, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/832,699

[22] Filed: Apr. 12, 1997

[51] Int. Cl.⁷ .................. G09G 3/30; G09G 5/10
[52] U.S. Cl. .................. 345/76; 345/77; 345/147
[58] Field of Search .................. 345/76, 84, 77, 345/85, 102, 147; 313/505, 506, 509, 586; 315/169.3

[56] References Cited

U.S. PATENT DOCUMENTS

| | | | |
|---|---|---|---|
| 4,818,982 | 4/1989 | Kuehn et al. | 345/77 |
| 5,053,675 | 10/1991 | Thioulouse | 313/505 |
| 5,075,596 | 12/1991 | Young | 315/169.3 |
| 5,093,654 | 3/1992 | Swift et al. | 345/76 |
| 5,144,292 | 9/1992 | Shiraishi et al. | 345/102 |
| 5,418,434 | 5/1995 | Kamens et al. | 315/205 |
| 5,652,600 | 7/1997 | Khormaei | 345/76 |
| 5,736,973 | 4/1998 | Godfrey et al. | 345/102 |
| 5,747,928 | 5/1998 | Shanks | 345/76 |
| 5,760,760 | 6/1998 | Helms | 345/102 |
| 5,805,136 | 9/1998 | Silverbrook | 345/147 |
| 5,844,540 | 12/1998 | Terasaki | 345/102 |

FOREIGN PATENT DOCUMENTS

| | | |
|---|---|---|
| 0653902 | of 1994 | European Pat. Off. . |
| 6177892 | of 1994 | European Pat. Off. . |
| 2099628 | of 1982 | United Kingdom . |

*Primary Examiner*—Vijay Shankar
*Attorney, Agent, or Firm*—Brooks & Kushman P.C.

[57] ABSTRACT

An electroluminescent display includes a plurality of generally parallel outer electrodes and a plurality of generally parallel inner electrodes perpendicular to the outer electrodes. A plurality of generally parallel reflective surfaces are formed parallel to the outer electrodes or the inner electrodes to selectively provide a mirrored appearance when the electroluminescent display is not activated. A variable transmissive device, such as an electrochromic dimmer, is positioned in front of the ELD to selectively dim the light emitted from the ELD.

22 Claims, 3 Drawing Sheets

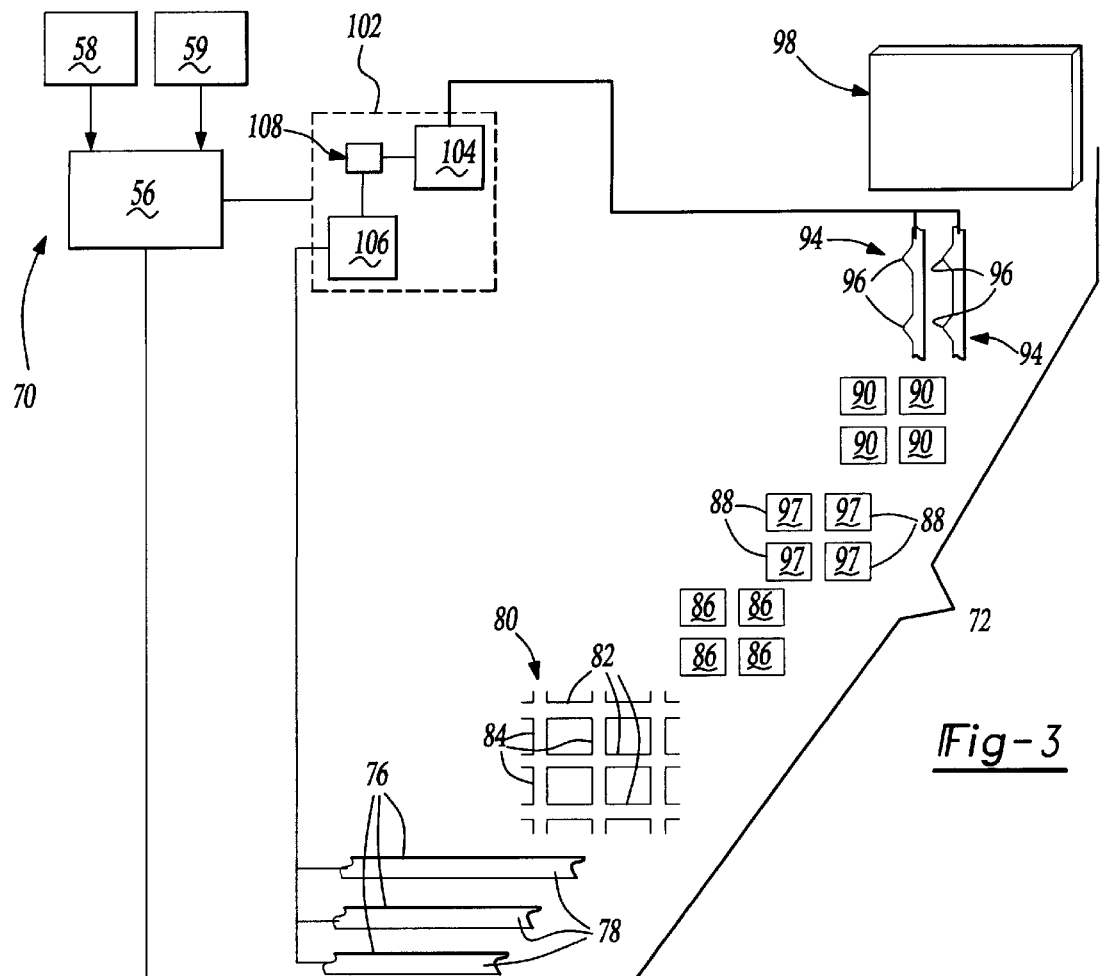
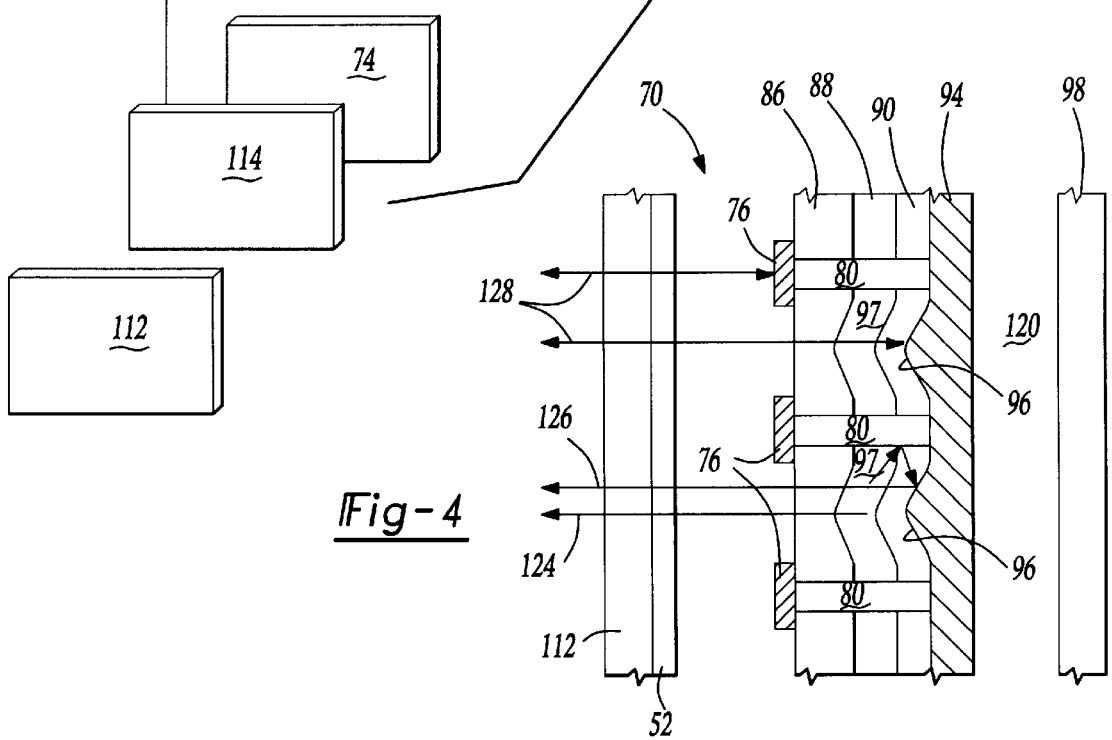

DIMMABLE ELD WITH MIRROR SURFACE

BACKGROUND OF THE INVENTION

The present invention relates generally to an electroluminescent display, and more particularly to an electroluminescent display integrated into a dimmable mirror.

Electroluminescent displays generally comprise a plurality of elongated, generally parallel outer electrodes generally perpendicular to a plurality of elongated, generally parallel inner electrodes spaced inwardly from the outer electrodes. An electroluminescent material, such as phosphor, is sandwiched between two dielectric layers and positioned between the outer electrodes and the inner electrodes. The entire structure is then encased between two panes of glass.

Each portion of the electroluminescent material where the inner and outer electrodes overlap forms single pixel. As is well known, activation circuitry sequentially places a voltage on each of the inner electrodes. While each of the inner electrodes is activated, selected ones of the perpendicular outer electrodes are activated with either an opposite or a ground potential. As is well known, the change in potential difference across the phosphor causes the phosphor between the activated inner electrode and the selected activated outer electrodes (selected pixels) to emit light. The next inner electrode is then activated, along with other selected ones of the outer electrodes to illuminate the next row (or column) of pixels. The pixels in the electroluminescent display are thus rapidly "scanned" to provide an image which appears continuous. The outer electrodes are manufactured of a transparent conductive material, such that the light emitted by the phosphor is visible through the front of the display.

The intensity of light emitted from an ELD can be controlled by modifying the magnitude of the change in potential difference across the electrodes, i.e. a greater change in potential difference will produce a higher intensity light. Further, the intensity of the light may also be controlled by varying the duration of the voltage pulse applied to each pixel. Further, the light intensity of an ELD may also be controlled by altering the scan or "refresh" rate of the ELD, e.g. increasing the refresh rate of the ELD will increase the light intensity emitted from the ELD. To some extent these methods can be used to dim an ELD in a vehicle, such as at night or in low light conditions. However, the magnitude of the change in potential difference can only be decreased down to a certain threshold below which the electroluminescent material will not generate light at all. Further, decreasing the refresh rate below a certain threshold results in noticeable unpleasant screen "flicker." Further, reducing the light intensity emitted from the ELD beyond a certain point causes any existing screen image "burned into" the ELD to become prominent.

Mirrors, such as sideview or rearview mirrors in a vehicle, are increasingly including integrated displays. Typically the display is located in a non-mirrored portion of the mirror, in which the mirror material is etched and does not provide a mirror appearance. Other mirrors include a plurality of LEDs generating light of a specific wavelength positioned behind a mirror surface which is specially coated to transmit light of the specified wavelength. Heretofore, however, an ELD has not been integrated into a mirror to selectively provide a mirrored appearance or the electroluminescent display.

SUMMARY OF THE INVENTION

The present invention provides a dimmable electroluminescent display which has a mirrored appearance when the electroluminescent display is not activated. The electroluminescent display generally comprises a plurality of elongated, laterally spaced, generally parallel outer electrodes spaced outwardly from a plurality of elongated, laterally spaced, generally parallel inner electrodes perpendicular to the outer electrodes. A plurality of elongated, laterally spaced, generally parallel reflective surfaces are formed generally parallel to either the outer electrodes or the inner electrodes and positioned outwardly of the inner and outer electrodes. In a first embodiment, the reflective surfaces are formed on a plurality of elongated, generally parallel, laterally spaced reflective strips spaced outwardly from the outer electrodes and generally parallel to but laterally offset from the inner electrodes. When the ELD is turned on, the ELD provides a reconfigurable display. When the ELD is not activated, a mirrored appearance is provided. Ambient light is reflected off the reflective surfaces and the inner electrodes to provide a mirrored appearance.

In a second embodiment, the reflective surface is formed directly on the outer electrodes. A reflecting dielectric extends from the outer electrode to the inner electrodes and includes row portions generally parallel to and aligned with the outer electrodes and column portions generally parallel to but laterally offset from the inner electrodes. The inner electrodes further include outwardly projecting portions generally centered between the column portions and row portions and reflecting dielectric. When the ELD is not activated, ambient light is reflected off the reflective surface formed on the outer electrode and off of the inner electrodes, thereby providing a mirrored appearance. When the ELD is activated, light generated by the electroluminescent material is transmitted directly outwardly or reflects off of the reflective dielectric and the outwardly projecting portion of the inner electrodes and then out through the front of the ELD, thereby increasing the amount of light emitted forwardly from the ELD to be visible to an observer.

Either of the ELD embodiments disclosed is dimmed first utilizing conventional techniques, such as reducing the magnitude of the change in potential difference across the electrodes or reducing refresh rate to a point which still provides a satisfactory display. To further dim the ELD, a variable transmissive device, such as an electrochromic filter, is positioned in front of the ELD. The transmissivity of the variable transmissive device is reduced to provide further dimming of the ELD without diminishing the quality of the display. The ELD may be integrated into a larger mirror surface having an electrochromic dimmer.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 is an exploded perspective view of several pixels of an alternate display system according to the present invention;

FIG. 4 is a sectional view through the display system of FIG. 3; and

DESCRIPTION OF A PREFERRED EMBODIMENT

Figure 1:
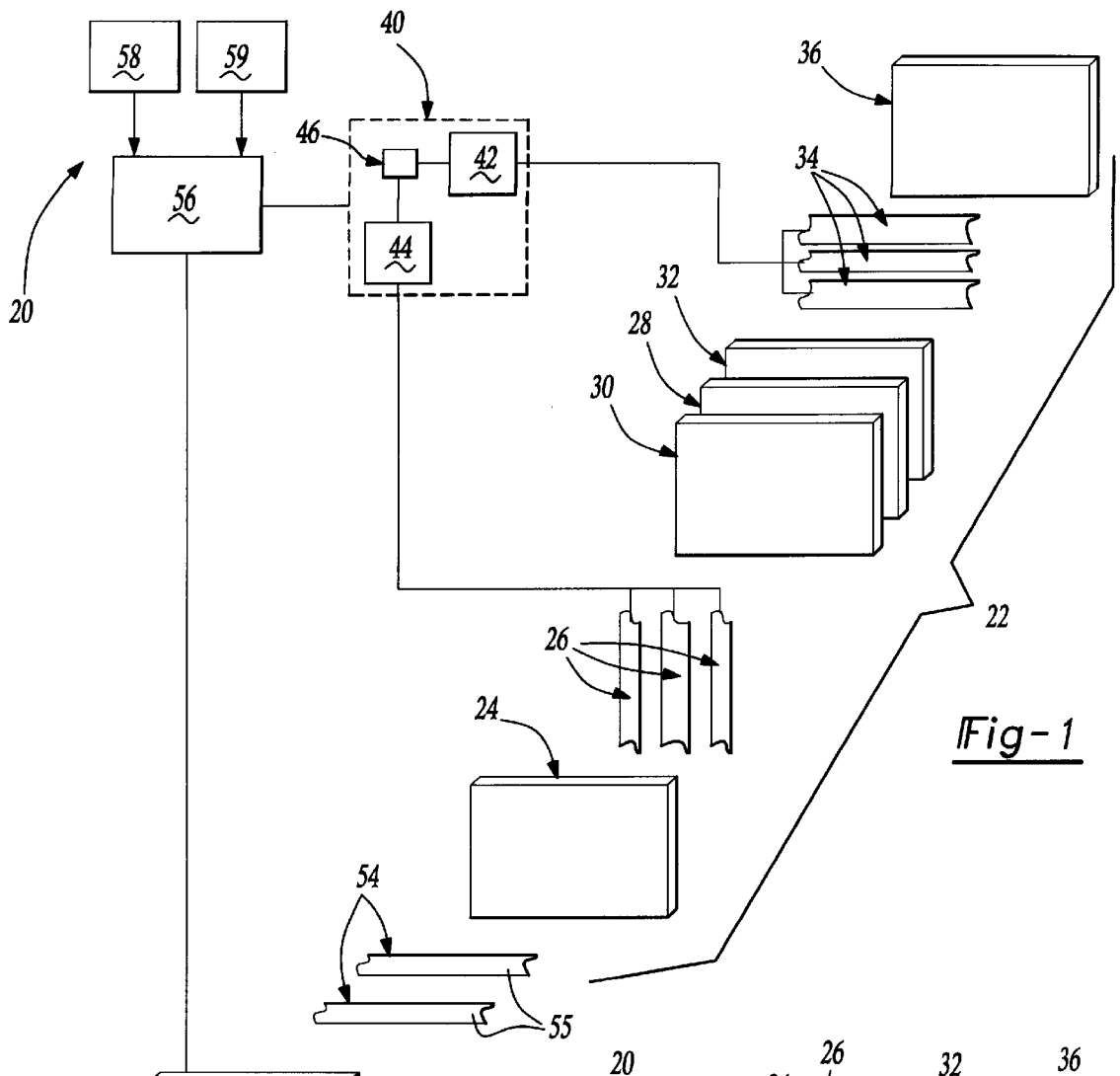
FIG. 1 is an exploded perspective view of several pixels of a display system according to the present invention.

A display system 20 according to the present invention includes an electroluminescent display 22, generally as is known in the art. The electroluminescent display 22 generally includes a glass 24 disposed in front of a plurality of elongated, generally parallel, laterally spaced outer electrodes 26 made of transparent conductive material (ITO). An electroluminescent material 28, such as zinc sulfide doped with manganese, is sandwiched between a first dielectric 30 and a second dielectric 32. The dielectrics 30, 32 are preferably SiON. Behind the second dielectric 32 are a plurality of elongated, generally parallel inner electrodes 34, preferably made of a conductive metal which is also light reflective, such as aluminum or chromium. The electroluminescent display 22 further includes a back glass 36 for covering the inner electrodes 34.

A pixel is formed wherever an outer electrode 26 overlaps an inner electrode 34. The electroluminescent display 22 further includes ELD control circuitry 40. As is known in the art, the ELD control circuitry 40 includes inner electrode activation circuitry 42 and outer electrode activation circuitry 44 which activate the inner and outer electrodes 34, 26 respectively based upon information stored in RAM 46. As is known in the art, the electroluminescent material 28 generates light when the potential between the inner electrode 34 and the outer electrode 26 is changed by a sufficiently high amount. In order to generate a display, the inner electrode activation circuitry 42 sequentially places a voltage on each inner electrode 34. While each inner electrode 34 is activated with a voltage from the inner electrode activation circuitry 42, the outer electrode activation circuitry 44 places a voltage of opposite polarity or a ground on selected outer electrodes 26 in order to illuminate selected pixels. In this manner, the entire matrix of pixels 38 is scanned to provide a display. Alternatively, the outer electrodes 26 could be activated sequentially.

A front glass 50 is disposed at the front of the display system 20 in front of a variable transmissive device 52, preferably an electrochromic dimmer such as is known in the art. A plurality of elongated, generally parallel, laterally spaced reflective strips 54 preferably comprising aluminum or chromium have a reflective surface 55. The reflective strips 54 are parallel to the inner electrodes 34, but laterally offset from the inner electrodes 34. The ELD control circuitry 40 and the variable transmissive device 52 are controlled by a controller 56, which could comprise a microprocessor system or logic circuitry. The controller 56 controls the intensity of light generated by ELD 22 and the transmissivity of variable transmissive device 52 based upon signals from an ambient light sensor 58 and manual switches 59.

Figure 2:
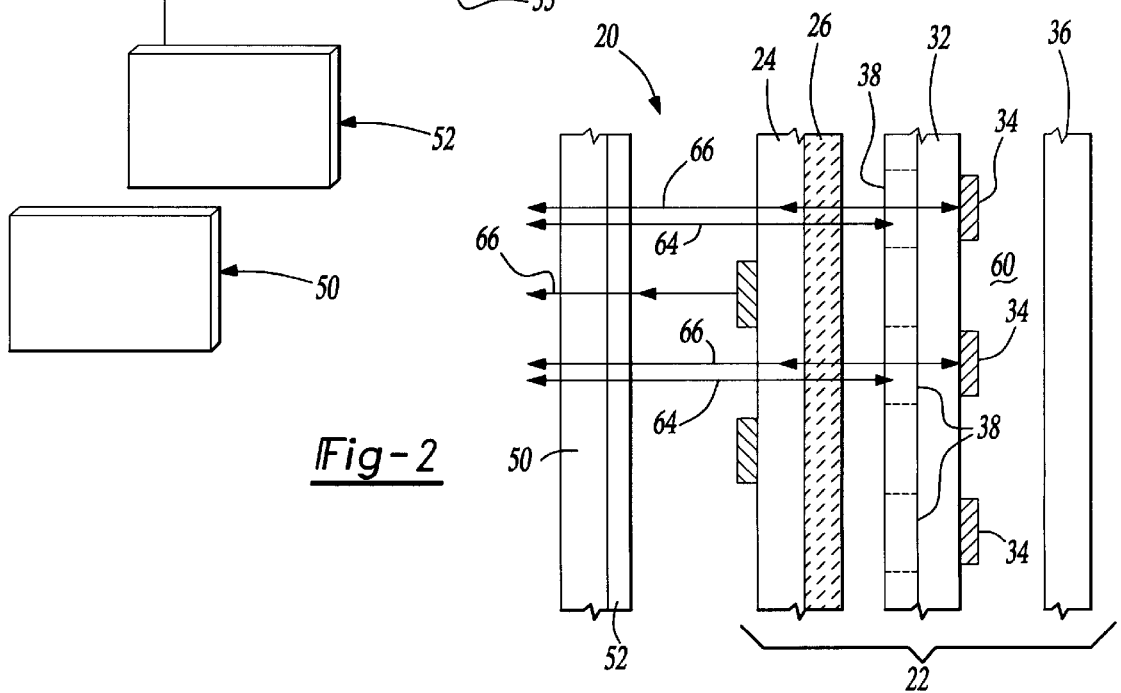
FIG. 2 is a sectional view through the display system of FIG. 1.

As can be seen in FIG. 2, when assembled, filling oil 60 is generally disposed between the second dielectric 32 and the back glass 36 to protect the inner electrodes 34 and provide structural stability. Upon activation of the inner electrode 34 and outer electrode 26 surrounding a pixel 38, the pixel 38 generates light 64 which is emitted through outer electrode 26, glass 24, the variable transmissive device 52 and front glass 50 to be visible to an observer. As is known, the magnitude of the change in potential difference applied to the pixel 38 and the duration of activation of the inner 26 and outer 34 electrodes change the intensity of the light 64 generated by the pixels 38. Further, the light 64 will appear to have a higher intensity if the scan rate or refresh rate is increased.

Preferably, in order to dim the ELD 22, the intensity of the light generated by the pixels 38 is first decreased, preferably by first decreasing the scan rate. The intensity of the light 64 generated by the pixels 38 may be further decreased by decreasing the potential applied to the pixels 38 and the duration of the pulse voltage applied to the pixels 38. However, as described above, the ELD 22 can only be dimmed to a certain point using these methods. Therefore, these methods are preferably first used to dim the ELD 22 to a point which is still satisfactory. Then, the controller 56 reduces the transmissivity of the variable transmissive device 52 to dim the ELD 22 further. When the transmissivity of the variable transmissive device 52 is decreased, less of the generated light 64 is emitted through the front glass 50 to be visible to an observer.

When there is no image or text to be displayed on the ELD 22, the ELD 22 is preferably in a low-power, standby mode. The display system 20 provides a mirror appearance when the ELD 22 is not generating light. Ambient light 66 is reflected back out through front glass 50 off of the reflective surface 55 on the reflective strips 54 and also off of inner electrodes 34. Because the reflective strips 54 are laterally offset but parallel to the inner electrodes 34, the appearance of a generally continuous reflective surface is provided. The mirror and mirrored surfaces 55, 34 of ELD 22 can be dimmed at night by decreasing the transmissivity of the variable transmissive device 52.

An alternate display system 70 having a unique ELD 72 is shown in FIG. 3. The ELD 72 comprises a glass 74 in front of a plurality of elongated, generally parallel laterally spaced outer electrodes 76. The outer electrodes 76 are preferably a conductive metal which is light reflective, such as aluminum or chromium, giving the outer electrodes 76 an outer reflective surface 78. The ELD 72 further includes a reflecting dielectric 80 comprising preferably a light reflecting dielectric material, such as SiON or $ZnSMgF_2$, as described in U.S. Pat. No. 4,803,402, the assignee of which is the assignee of the present invention. The reflecting dielectric 80 is preferably in the form of a grid having row portions 82 generally parallel and aligned with outer electrodes 76 and perpendicular column portions 84. The ELD 72 further includes a first dielectric 86, electroluminescent material 88, and second dielectric 90 as is generally used in ELDs and as described above with respect to the embodiment shown in FIG. 1. This first dielectric 86, electroluminescent material 88 and second dielectric 90 are shaped and sized to fit between row portions 82 and column portions 84 of the reflecting dielectric 80.

The ELD 72 further includes a plurality of elongated, generally parallel, laterally spaced inner electrodes 94. The inner electrodes 94 are preferably a conductive metal which is also highly light reflective, such as aluminum or chromium. The inner electrodes 94 are preferably parallel to and laterally displaced from the column portions 84 of the reflecting dielectric 80. The inner electrodes 94 each include a plurality of outwardly projecting portions 96 which are aligned and spaced to fall midway between the row portions 82 of the reflecting dielectric 80. A pixel 97 is defined between each pair of outer electrodes 76 and each inner electrode 94, corresponding to each section of electroluminescent material 88 between the real portions 82 and column portions 84 of the reflecting dielectric 80. The ELD 72 further comprises a back glass 98 behind the inner electrodes 94.

The ELD 72 includes ELD control circuitry 102 comprising inner electrode activation circuitry 104 and outer electrode activation circuitry 106 for activating the inner electrodes 94 and outer electrodes 76 respectively, according to information stored in RAM 108. A pixel 97 of electroluminescent material 88 generates light upon the activation of the corresponding adjacent pair of outer electrodes 76 and the adjacent inner electrode 94. Therefore, the ELD control circuitry 102 is modified from that described with respect to the embodiment shown in FIG. 1 accordingly. The inner electrode activation circuitry 104 sequentially activates the inner electrodes 94 based upon information in RAM 108. Simultaneously, for each inner electrode 94 activated, a pair of adjacent outer electrodes 76 are activated by outer electrode activation circuitry 106 in order to activate the appropriate pixels 97. It should be apparent that the outer electrodes 76 could alternatively be activated sequentially, with selected inner electrodes 94.

The ELD 72 further comprises a front glass 112 in front of a variable transmissive device 114, preferably an electrochromic dimmer. The display system 70 further comprises the controller 56 controlling the variable transmissive device 52 and the ELD control circuitry 102 based upon data from the ambient light sensor 58 and manual switches 59.

The assembled display system 70 is shown in a sectional view in FIG. 4. Again, as is known in the art, the filling oil 120 is preferably disposed between the inner electrodes 94 and the back glass 98 to protect the inner electrodes 94 and provide structural stability. As can be seen in FIG. 4, the outwardly projecting portions 96 of the inner electrodes 94 are offset from the outer electrodes 76. Further, the reflecting dielectric 80 extends from the outer electrodes 76 to the inner electrodes 94.

In operation, when an adjacent pair of outer electrodes 76 and an inner electrode 94 are activated, the electroluminescent material 88 in the corresponding pixel 97 generates light. Some of the light 124 is transmitted directly through the front glass 112 to be visible to an observer. Since the light generated by the electroluminescent material 88 is generated in all directions, additional light 126 is reflected off of the reflecting dielectric 80 and/or inner electrode 94, including the outwardly projecting portion 96 and out through front glass 112. The outwardly projecting portion 96 thus assists in directing light 126 outward through the front glass 112. The reflective dielectric 80 further assists in directing light 126 outward through front glass 112 which would otherwise have been lost because it was transmitted in the plane of the electroluminescent material 88. Therefore, more of the light generated by the electroluminescent material 88 is directed through the front glass 112 to be visible to an observer.

When there is no image or text to be displayed on the ELD 72, the ELD 72 is preferably in a low-power, standby mode. When the ELD 72 is not illuminated, the ELD 72 has a mirrored appearance. Ambient light 128 is reflected outwardly through front glass 112 off the reflective surface 78 on the outer electrodes 76 and the inner electrodes 94. Thus the ELD 72 can selectively provide a mirrored appearance and therefore be integrated into a side view or rearview mirror. The mirror and mirrored surfaces 78, 76 of ELD 72 can be dimmed at night by decreasing the transmissivity of the variable transmissive device 52.

The ELD 72 can be dimmed utilizing the ELD control circuitry 102 as described above, such as by reducing the voltage, voltage duration, or refresh rate. The ELD 72 can be further dimmed, along with the mirror surface provided, by decreasing the transmissivity of the variable transmissive device 52. The controller 56 controls the ELD control circuitry 102 and the transmissivity of the variable transmissive device 52.

Figure 5:
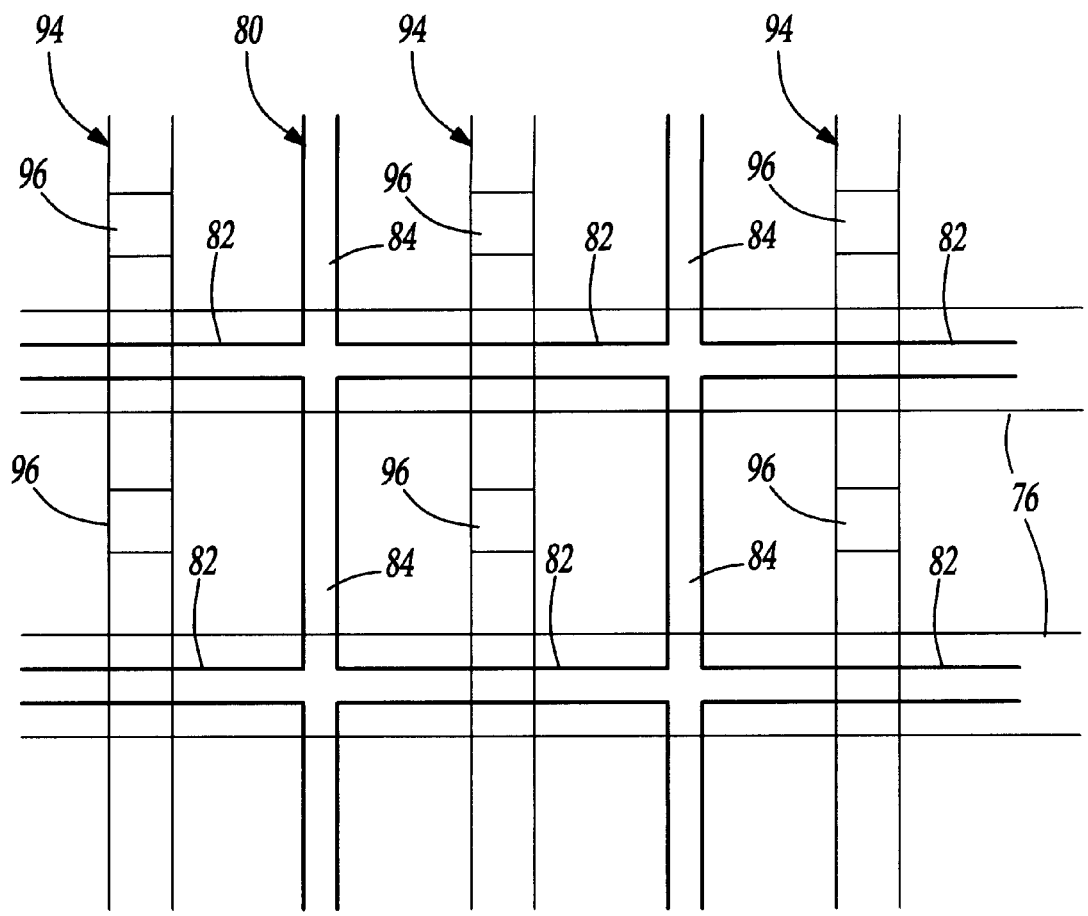
FIG. 5 is a front view of the display system of FIG. 3.

As can be seen in FIG. 5, the row portions 82 of the reflecting dielectric 80 are generally parallel to and aligned with the outer electrodes 76. The column portions 84 of the reflecting dielectric 80 are generally parallel to, but laterally offset from the inner electrodes 94. The outwardly projecting portions 96 of the inner electrodes 94 are preferably centered between the row portions 82 and the column portions 84. A pixel 97 is formed by the electroluminescent material 88 between each adjacent pair of row portions 82 and adjacent pairs of column portions 84.

The present invention provides an ELD which selectively provides a mirrored appearance when the ELD is not activated. The ELD can thus be integrated into a sideview mirror, wherein the ELD portion comprises a portion of the mirror surface or the entire mirror surface. The ELD can be dimmed using an electrochromic dimmer, which can be the electrochromic dimmer already provided with the rearview or sideview mirror. It should be apparent that the dimmable ELD of the present invention could be used apart from the mirrored surface. Further, the ELD with a selective mirror appearance could be used without the variable transmissive device.

In accordance with the provisions of the patent statutes, the present invention has been described in what is considered to represent a preferred embodiment. However, it should be noted that the invention can be practiced otherwise than as specifically illustrated and described without departing from its spirit or scope.

What is claimed is:

1. A dimmable display system comprising:

a display emitting light outwardly from said display;

a selectively variable transmissive device disposed outwardly of said display, said light emitted from said display passing through said variable transmissive device;

a controller for selectively reducing the transmissivity of said variable transmissive device to adjust a brightness of said display system.

2. The display system of claim 1 wherein said display has a matrix of pixels illuminated by a voltage, said controller selectively reducing said voltage supplied to said pixels to selectively reduce the light emitted from said display.

3. The display system of claim 2 wherein said display has a matrix of pixels having a frame rate at which the pixels are illuminated, said controller selectively reducing said frame rate of said display to selectively reduce the light emitted from said display.

4. The display system of claim 1 wherein said controller reduces the light emitted from said display before reducing the transmissivity of said variable transmissive device to reduce a brightness of said display system.

5. The display system of claim 1 wherein said variable transmissive device is an electrochromic filter.

6. The display system of claim 1 wherein said display includes:

a plurality of elongated, generally parallel outer electrodes;

a plurality of elongated, generally parallel inner electrodes having a reflective surface, wherein the inner electrodes are spaced inwardly from said outer electrodes and generally perpendicular to said outer electrodes; and a plurality of elongated, generally parallel reflective surfaces formed on said outer electrodes.

7. An electroluminescent display system comprising:

a plurality of elongated, generally parallel outer electrodes;

a plurality of elongated, generally parallel inner electrodes, spaced inwardly from said outer electrodes and generally perpendicular to said outer electrodes, the inner electrodes having a reflective surface;

an electroluminescent material disposed generally between said outer electrodes and said inner electrodes, said electroluminescent material generating light outwardly from said display upon activation of said inner and outer electrodes; and a plurality of elongated, generally parallel reflective surfaces substantially parallel to one of said outer electrodes and said inner electrodes, said reflective surfaces positioned outwardly of said inner and outer electrodes.

8. The electroluminescent display of claim 7 wherein said reflective surfaces are each formed on an outer surface of one of said outer electrodes.

9. The electroluminescent display of claim 7 wherein said reflective surfaces are parallel to said inner electrodes and spaced outwardly from said outer electrodes.

10. The electroluminescent display of claim 9 wherein said reflective surfaces are laterally offset from said inner electrodes.

11. The electroluminescent display of claim 7 wherein each said of said plurality of inner electrodes includes an outwardly projecting portion between each pair of said outer electrodes.

12. The electroluminescent display of claim 7 further including a selectively variable transmissive device disposed in front of said outer electrodes.

13. The electroluminescent display of claim 7 further including:

each of a plurality of pixels formed between each adjacent pair of said outer electrodes and each said inner electrode;

activation circuitry activating each of said plurality of said pixels by activating an adjacent pair of said outer electrodes and each of said inner electrodes to illuminate the electroluminescent material between said adjacent pair of said outer electrodes and said each inner electrode.

14. An electroluminescent display system comprising:

a plurality of elongated, generally parallel first electrodes generally disposed in a first plane and having a reflective surface;

a plurality of elongated, generally parallel second electrodes having a reflective surface, the second electrodes being generally disposed in a second plane, wherein said first electrodes are spaced outwardly from and generally perpendicular to said second electrodes;

an electroluminescent material disposed generally between said first electrodes and said second electrodes, each of a plurality of pixels formed between each adjacent pair of said first electrodes and each said second electrode;

activation circuitry activating one of said plurality of pixels by activating an adjacent pair of said first electrodes and at least one of said second electrodes to illuminate the electroluminescent material between said pair of said first electrodes and said at least one second electrode, said illuminated electroluminescent material generating light outwardly from said display.

15. The electroluminescent display system of claim 14 wherein said first electrodes are spaced outwardly from said second electrodes.

16. The electroluminescent display system of claim 14 therefor wherein said first electrodes each include a generally reflective outer surface.

17. The electroluminescent display system of claim 14 wherein said each of said plurality of second electrodes include therefor an outwardly projecting portion between each pair of said first electrodes.

18. The electroluminescent display system of claim 14 wherein each of said plurality of first electrodes comprises a non-transparent metal.

19. The electroluminescent display system of claim 14 further including a light-reflecting dielectric extending from said first electrodes to said second electrodes.

20. The electroluminescent display of claim 19 wherein said dielectric includes a plurality of generally parallel, elongated first portions adjacent said first electrodes and parallel to said first electrodes.

21. The electroluminescent display of claim 20 wherein said dielectric further includes a plurality of generally parallel, elongated second portions parallel to said second electrodes, said first portions continuous with said second portions.

22. A display system comprising:

a plurality of elongated, generally parallel outer electrodes;

a plurality of elongated, generally parallel inner electrodes, spaced inwardly from said outer electrodes and generally perpendicular to said outer electrodes, each said inner electrode including an outwardly projecting portion between each pair of said outer electrodes;

a plurality of elongated, generally parallel reflective surfaces formed on said outer electrodes;

an electroluminescent material disposed generally between said outer electrodes and said inner electrodes, a pixel formed between each adjacent pair of said outer electrodes and each of said inner electrodes;

means for activating each of said pixels by activating each adjacent pair of said outer electrodes and each of said inner electrodes to illuminate the electroluminescent material between said adjacent pair of said outer electrodes and said each of said inner electrodes;

a selectively variably transmissive device disposed outwardly of said display, said electroluminescent material generating light outwardly from said display when illuminated and selectively through said variably transmissive device; and a controller for selectively reducing the transmissivity of said variably transmissive device to selectively adjust the light through said variably transmissive device.

* * * * *

UNITED STATES PATENT AND TRADEMARK OFFICE
CERTIFICATE OF CORRECTION

PATENT NO : 6,091,383
DATED : July 18, 2000
INVENTOR(S) : Marian Borzea et al.

It is certified that error appears in the above-identified patent and that said Letters Patent are hereby corrected as shown below:

Column 8, Line 11, Delete "therefor".

Signed and Sealed this

Seventeenth Day of April, 2001

Attest:

NICHOLAS P. GODICI

Attesting Officer

*Acting Director of the United States Patent and Trademark Office*